(12) United States Patent
Abdelaziz et al.

(10) Patent No.: US 7,464,168 B1
(45) Date of Patent: Dec. 9, 2008

(54) MECHANISM FOR DECENTRALIZED ENTITY PRESENCE

(75) Inventors: Mohamed M. Abdelaziz, Santa Clara, CA (US); Bernard A. Traversat, San Francisco, CA (US); Juan Carlos Soto, Kensington, CA (US)

(73) Assignee: Sun Microsystems, Inc., Santa Cruz, CA (US)

( * ) Notice: Subject to any disclaimer, the term of this patent is extended or adjusted under 35 U.S.C. 154(b) by 709 days.

(21) Appl. No.: 10/968,544

(22) Filed: Oct. 19, 2004

(51) Int. Cl.
   *G06F 15/16* (2006.01)
(52) U.S. Cl. .................................................. 709/229
(58) Field of Classification Search ................. 709/203, 709/206, 221, 223, 229
   See application file for complete search history.

(56) References Cited

U.S. PATENT DOCUMENTS

| | | | | |
|---|---|---|---|---|
| 6,909,721 | B2* | 6/2005 | Ekberg et al. | 370/401 |
| 6,983,326 | B1* | 1/2006 | Vigue et al. | 709/229 |
| 7,050,810 | B2 | 5/2006 | Brusilovsky et al. | |
| 7,216,147 | B2* | 5/2007 | Blagsvedt et al. | 709/206 |
| 2003/0105812 | A1* | 6/2003 | Flowers et al. | 709/203 |
| 2003/0191828 | A1* | 10/2003 | Ramanathan et al. | 709/221 |
| 2004/0088646 | A1 | 5/2004 | Yeager et al. | |
| 2004/0133640 | A1 | 7/2004 | Yeager et al. | |
| 2005/0050227 | A1* | 3/2005 | Michelman | 709/245 |

* cited by examiner

*Primary Examiner*—Ario Etienne
*Assistant Examiner*—Hee Soo Kim
(74) *Attorney, Agent, or Firm*—Robert C. Kowert; Meyertons, Hood, Kivlin, Kowert & Goetzel, P.C.

(57) ABSTRACT

System and method for decentralized entity presence are described. Presence services may collaborate to form a presence service view on the network. A node providing an entity on the network may provide an entity advertisement to a presence service to advertise the entity's presence on the network. The presence information may be indexed locally by a presence service, and the indexes may be shared with one or more other presence services within the presence service view. A presence service may accept queries from nodes for a specific entity, and walk the query within the presence service view to locate the target entity. The query may then be forwarded to the node advertising the presence entity. The node providing the entity may respond directly to the querying node without going through the presence service. A presence contract may then be negotiated between the nodes without going through the presence service.

38 Claims, 5 Drawing Sheets

MECHANISM FOR DECENTRALIZED ENTITY PRESENCE

BACKGROUND OF THE INVENTION

1. Field of the Invention

This invention relates to networking, and more particularly to detecting the presence entities in a distributed networking environment.

2. Description of the Related Art

Presence in a decentralized networking environment is difficult to establish and scale without a central server. In a distributed environment, presence is manageable with a small number of nodes and presence entities. However, it becomes more difficult to establish presence in a decentralized environment as the number of nodes and presence entities on the network grows.

In a decentralized networking environment, some servers may provide presence services that may be used by entities to locate other presence entities and to negotiate contracts between the entities. Conventionally, presence entities always communicate with the central presence service that maintains the presence information. Contact is maintained between the presence entity and the presence service. When another entity is interested in a presence entity, it communicates with the presence service rather than with the presence entity itself, both for locating the presence entity and for contract negotiation.

An example of a conventional presence entity is AOL's AIM instant messenger service. A conventional presence service such as AIM, which may have thousands of servers which may perform tasks such as determining what regions presence entities are in, what presence entities such as services are available, and contract negotiations, may require considerable compute resources and storage to support a large network.

JXTA™

Sun's JXTA™ is an exemplary peer-to-peer platform. Peer-to-peer platforms such as JXTA may provide protocols for building networking applications that thrive in dynamic environments. JXTA technology is a set of open protocols that allow any connected device on the network ranging from cell phones and wireless PDAs to PCs and servers to communicate and collaborate in a peer-to-peer (P2P) manner. JXTA peers create a virtual network where any peer can interact with other peers and resources directly even when some of the peers and resources are behind firewalls and NATs or are on different network transports. In JXTA, every peer is identified by an ID, unique over time and space. Peer groups are user-defined collections of entities (peers) that may share a common interest. Peer groups are also identified by unique IDs. Peers may belong to multiple peer groups, discover other entities and peer resources (e.g. peers, peer groups, services, content, etc.) dynamically, and publish themselves and resources so that other peers can discover them.

Shared Resource Distributed Index (SRDI)

Conventionally, JXTA provides a mechanism to query peers for shared resources (such resources include, but are not limited to, advertisements and pipe instances). Queries are propagated in a semi-controlled fashion, without any discretion as to whether the receiving end would likely have a response or not. In situations where a query cannot be fulfilled, the query may potentially reach every peer several times.

SRDI provides a generic mechanism that JXTA services may utilize to distribute indices of shared resources with other peers that are grouped as a set of more capable peers, such as rendezvous peers. These indices may be used to direct queries in the direction where the query is most likely to be answered, and to re-propagate messages to peers interested in the propagated messages.

JXTA services that expose resources, such as Discovery and Pipe services (or any other service implementing the SRDI interface) may, on initial connection to a rendezvous, share a list of entries describing the resources for which they choose a broader exposure. In addition, at a configurable interval (or at the creation of the resource), deltas may be uploaded to the rendezvous, and coalesced. The rendezvous peer then stores/hashes these key/value pairs. In addition, the receiving peer (through a hash function coupled with the RPV (Rendezvous Peer View)) selects a rendezvous where these entries are replicated; this same function would later be used in directing queries.

The rendezvous leverages the mechanism of its relationship with the peer to garbage collect indices/hashes when a peer severs the session with the rendezvous. In the event of rendezvous failure, the edge peer attempts to reconnect to another rendezvous, and indices of shared resources are republished on the new rendezvous.

Each entry may carry an absolute expiration time expressed in milliseconds, which is converted to a relative time by the receiving peer. Expired entries are garbage collected at a configured interval, or when the cache reaches a high water mark, whichever is sooner.

Local neighborhood queries are propagated to neighboring peers (using what a transport defines as the broadcast/multicast method). Local peers receiving the query would behave conventionally. A query that goes beyond a local neighborhood query may be sent to connected rendezvous peers; a rendezvous peer may attempt to satisfy the query against the local cache. If there is no match against local cache, the query may be compared against a lists of stored/hashed key/values for a possible match; the query is then forwarded to where the match(es) are. Since queries may define a threshold, the discretion of honoring the threshold is left up to the rendezvous peer, and ultimately the queried peer. If this does not produce a result, the query may be mapped to a starting point of the RPV (Rendezvous Peer View). A Limited Range Walker may be utilized to re-propagate the query within the RPV. Once the query reaches a peer that may be able to respond, the peer replies directly to the originator of the query.

Indices may be replicated among rendezvous peers through a SHA1 hash of the entries modulus the RPV (Rendezvous Peer View); this provides an independent mapping of queries, without the need of a highly consistent RPV. The combination of direct routing of queries (using the map function), and use of a failover mechanism of a Limited Range Walk yields an efficient query and message routing mechanism without the need for a highly consistent/fault tolerant system.

For edge peers, queries may be propagated using an Edge Peer Walker mechanism (local multicast, and propagation to connected rendezvous). For rendezvous peers, using SRDI, a direct route is attempted within the scope of the rendezvous, otherwise the mapping function derived from the query may be used to provide a starting point of the query re-propagation, after which (if a direct query route is not found) a Limited Range Walker may be used to re-propagate the query.

For edge peers, messages may be propagated using an Edge Peer Walker mechanism (local multicast, and propagation to connected rendezvous). For rendezvous peers, propagated messages may be re-propagated to a list of peers (derived from SRDI, a list of peers that are listening on the destination propagate pipe), and re-propagated to other rendezvous using a Random Walker.

In JXTA, services that wish to utilize the SRDI mechanism may implement the Resolver SrdiHandler and register with the ResolverService. The ResolverSrdi message is a generic envelope that defines the Handlemame (service id), and the credential document associated with the message; however, it does not define the payload. A generic SRDI message for the Discovery Service and the Pipe Service may be provided. A service may implement its own SRDI payload that best fits its need.

Resolver Service

JXTA provides a mechanism for querying for resources and/or routing messages on the P2P network through a resolver service implemented according to one or more JXTA resolver protocols. A resource on a P2P network (which may be a service, an application, a peer, or any other presence on the P2P network) may register one or more resource handlers with a resolver service. The resource handlers may respond to incoming queries by parsing each query and generating a response message to the query. A peer node may send a query message, formatted in accordance with the resolver protocol, for a resource to a resolver service implemented on a node in the P2P network. The query message may include one or more of, but is not limited to, a credential for the querying peer node, a query identifier, a query, and a handler name that may identify a particular resource handler.

Upon receiving a query message, a resolver service may determine which of the resource instances is to receive the query message. The determination may be made using one or more of a variety of criteria to determine an optimal resource instance to receive the query using the particular criteria. The resolver service may then forward the query message to the resource handler indicated in the query message on a determined resource instance. The resource handler may parse the query included in the query message and generate a response to the query. The resource handler on the determined resource instance may then send a response message including the response to the resolver service. Alternatively, the resource handler may send the response message to the querying peer node. Alternatively, the resource instance may not use the resource handler; the resource instance may instead receive the query message, generate a response message, and send the response message to a resolver service or the peer node. The resolver service may receive the response message and forward it to the querying peer node. A response message may include one or more of, but is not limited to, the credential of the peer node hosting the resource instance, the query identifier, the handler name, and the response that includes the information requested by the query.

SUMMARY

Embodiments of a system and method for decentralized entity presence are described. Embodiments may provide a mechanism for decentralized entity presence that may move at least part of the burden off the server nodes providing the presence service and onto the edge nodes of the network containing the entities themselves. The decentralized entity presence mechanism may include, but is not limited to, presence services, collaboration between the presence services using P2P platform (e.g., JXTA) protocols such as peer view formation, and Shared Resource Distributed Index (SRDI) to distribute indices and route queries.

In one embodiment, two or more presence services on nodes on the network may collaborate to form a presence service view on the network. A presence service may allow publishing of entities that may be located on, or provided through, other nodes on the network using entity advertisements. In one embodiment, a node providing an entity on the network may provide an entity advertisement to a presence service on the network to advertise the entity's presence on the network. The presence information may be replicated between two or more of the presence services, for example using SRDI. Thus, the presence information for entities may be indexed locally by a presence service, and the index may be shared with one or more other presence services within the presence service view. Note that, in one embodiment, an entity does not have to be a "peer" on the peer-to-peer network; in other words, the entity does not have to directly support P2P network protocols or participate as a peer in a P2P network to advertise on or be located by the presence services in the presence service view.

A presence service may accept queries from nodes for a specific entity, and walk the query within the presence service view to locate the target entity. The query may then be forwarded to the node advertising the presence entity. The node providing the presence entity may respond directly to the querying node without going through the presence service. A presence contract may then be negotiated between the nodes without going through the presence service. Thus, contract negotiation may be performed directly between two entities or edge nodes, rather than with the presence services. In P2P terms, the contract and notification burden is moved to the edge nodes rather than the burden for contracts and notifications being directly with the presence services.

In one embodiment, each entity may specify an expiration time in its advertisement. The expiration time may be used to age the entity advertisement, and the entity advertisement may be removed from the presence service view once expired. Nodes hosting an entity may extend or revoke the lifetime of the entity advertisement.

Note that JXTA™ is an exemplary peer-to-peer platform for implementing embodiments of the decentralized entity presence mechanism; other peer-to-peer platforms, or even other mechanisms than peer-to-peer platforms, may be used to implement embodiments of the decentralized entity presence mechanism.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

Embodiments of a system and method for decentralized entity presence are described. A presence service may require considerable compute resources and storage to support a large network. Embodiments may provide a mechanism for decentralized entity presence that may move at least part of the burden off the server nodes providing the presence service and onto the edge nodes of the network containing the entities themselves. The decentralized entity presence mechanism may include, but is not limited to, presence services, collaboration between the presence services using P2P platform (e.g., JXTA) protocols such as peer view formation, and Shared Resource Distributed Index (SRDI) to distribute indices and route queries.

In one embodiment of a decentralized entity presence mechanism, a node providing an entity on the network may provide an entity advertisement to a presence service on the network to advertise the entity's presence on the network. In one embodiment, an entity advertisement may be a document, for example a markup language (e.g., XML) document, containing metadata about the entity. An entity may be a user, a service, a device such as a printer, or anything that is "alive" or present on the P2P network. Note that, in one embodiment, an entity does not have to be a "peer" on the peer-to-peer network; in other words, the entity does not have to directly support P2P network protocols or participate as a peer in a P2P network to advertise on or be located by the presence services in the presence service view.

In one embodiment, two or more presence services on nodes on the network may collaborate to form a presence service network view on the network. The presence services may form a presence service view similar to a distributed database that is specific to entity presence information. A presence service may allow publishing of entities that may be located on, or provided through, other nodes on the network using entity advertisements. The presence information may be replicated between two or more of the presence services. The presence information for entities may be indexed locally by a presence service, and the index may be shared with one or more other presence services within the presence service view.

A presence service may accept queries from nodes for a specific entity, and walk the query within the presence service view to locate the target entity. The query may then be forwarded to the node advertising the presence entity. The node providing the presence entity may respond directly to the querying node without going through the presence service. A presence contract may then be negotiated between the nodes without going through the presence service.

Thus, contract negotiation may be performed directly between two entities or edge nodes, rather than with the presence services. In P2P terms, the contract and notification burden is moved to the edge nodes (peers) rather than the burden for contracts and notifications being directly with the presence services, as in conventional P2P systems. The presence services dictate the resolution of presence entities and the routing of queries to resolve entity presence.

Note that embodiments of a decentralized entity presence mechanism may be implemented using one or more presence services. For scalability and failover, however, two or more presence services may be used. The number of entities a single presence service can support may be limited by its resources. Thus, embodiments may provide a mechanism for presence services to collaborate and share indices to support larger networks than can be supported using a single presence service.

In one embodiment, each entity may specify an expiration time in its advertisement. The expiration time may be used to age the entity advertisement, and the entity advertisement may be removed from the presence service view once expired. Nodes hosting an entity may extend or revoke the lifetime of the entity advertisement.

Note that JXTA™ is used herein as an exemplary peer-to-peer platform for implementing embodiments of the decentralized entity presence mechanism; other peer-to-peer platforms, or even other mechanisms than peer-to-peer platforms, may be used to implement embodiments of the decentralized entity presence mechanism.

FIGS. 1 through 4 illustrate means for sharing presence information for entities on a network among a plurality of presence services, means for routing queries for particular entities from edge nodes through the plurality of presence services to the particular entities on the network using the shared presence information, and means for directly negotiating contracts between the edge nodes and the particular entities without going through the presence entities.

Figure 1:
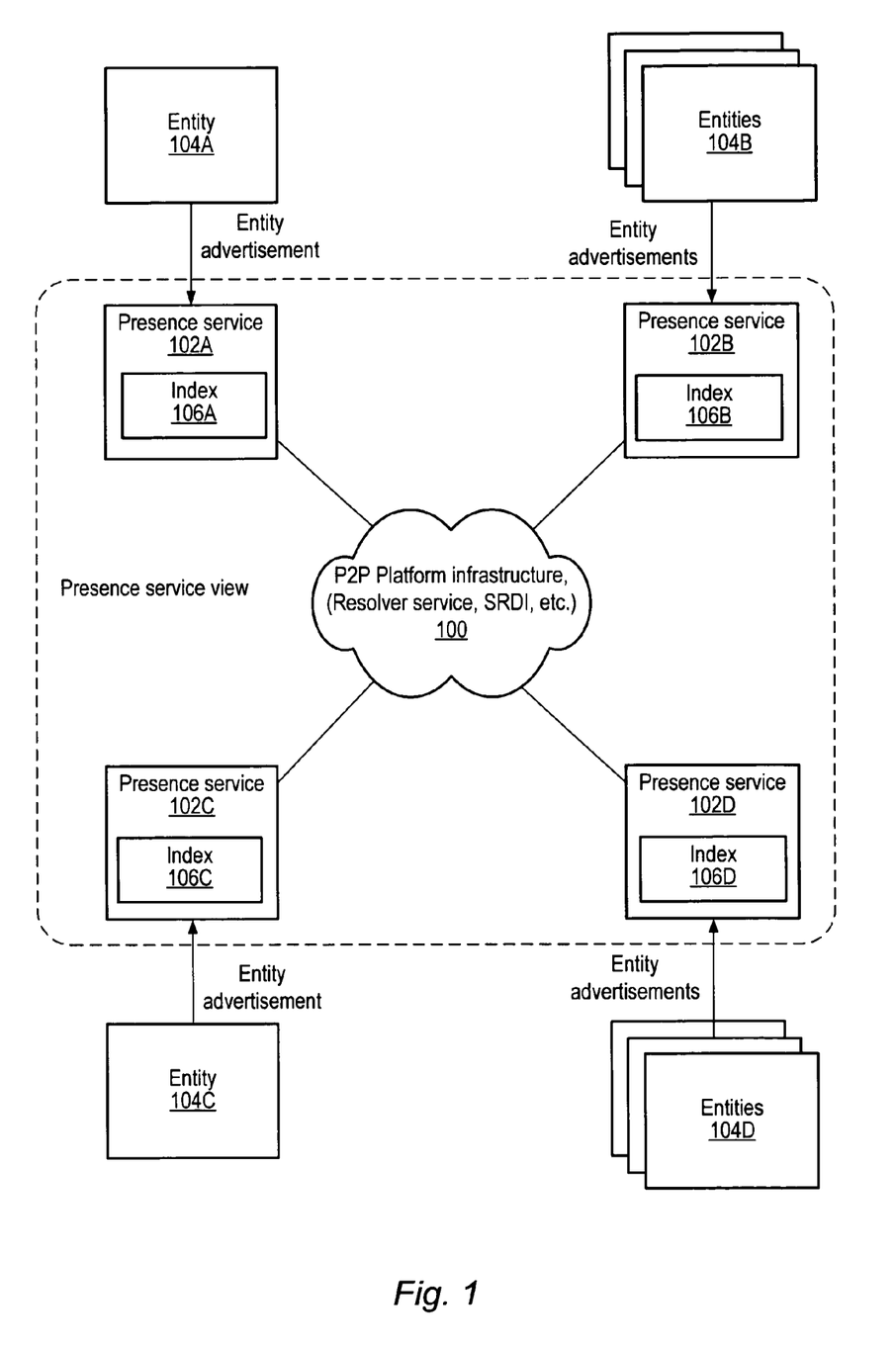
FIG. 1 illustrates a decentralized entity presence mechanism in a peer-to-peer (P2P) network environment according to one embodiment.

FIG. 1 illustrates a decentralized entity presence mechanism in a peer-to-peer (P2P) network environment according to one embodiment. A presence service may use a P2P network to collaborate with other presence services. In one embodiment, the P2P network may be implemented according to a peer-to-peer platform such as the JXTA peer-to-peer platform. Two or more presence services 102 hosted on nodes in the P2P network may interact to form a presence service "view". In one embodiment, a presence service 102 may participate in the network by implementing a presence service protocol provided by the P2P platform (e.g., JXTA), and joining the presence service view. In one embodiment, in a JXTA network, the presence services 102 may be on rendezvous peers.

Entities 104, which may be hosted on or provided by nodes on the network, may connect to particular presence services 102 in the presence service view via the network, and may provide entity advertisements including presence information for the entities 104 to the presence services 102. The presence information for entities 104 may be indexed locally by the presence services 102 in indices 106. A presence service 102 may share its index 106 with one or more other presence services 102 within the presence service view, e.g. via a Shared Resource Distributed Index (SRDI) mechanism.

A node on the network may send a query for an entity 104 to one of the presence services 102. The query may then be routed in the presence service view to the particular presence service 102 that originally received and indexed the advertisement, or alternatively to another presence service 102 with which the original presence service 102 shared its index 106. In one embodiment, a resolver service or services, which may be implemented according to a JXTA resolver protocol, may be used in routing queries to presence services 102 in the P2P network. The query may then be forwarded to the node that hosts or provides the target entity 104.

After receiving the query, the node hosting the target entity 104 may respond directly to the querying node, and the two nodes may directly negotiate a contract for accessing the entity 104.

Embodiments of the decentralized entity presence mechanism may provide a mechanism or mechanisms to detect when a particular entity 104, type of entity, or group of entities is present on a P2P network. An entity 104 may be a user, a service, a device such as a printer, or anything that is "alive" or present on the P2P network. Note that, in one embodiment, the entity 104 does not have to be a "peer" on the peer-to-peer network; in other words, the entity 104 does not have to directly support P2P network protocols. As an example, an entity 104 may be a printer that does not support P2P network protocols, but that is connected to a node that supports P2P network protocols. An entity 104 only needs to be able to advertise its presence on the P2P platform using some mechanism. Note that an entity 104 may construct its advertisement and provide the advertisement to a peer node that then provides the advertisement to a presence service 102, or alternatively an entity 104 may provide the advertisement directly to the presence service 102. Alternatively, a peer node may construct an advertisement for an entity 104 provided by the peer node and then provide the advertisement for the entity 104 to the presence service 102. Thus, embodiments may allow the advertisement of non-peers in the P2P network, and queries may be issued on the P2P network to find entities that are not peers in the P2P network.

As another example, a presence entity 104 may be an AOL messenger. Using AIM, a user may log in and describe themselves with their name and other information (metadata). The metadata about the presence entity 104 (user) may be represented in an advertisement. The advertisement for the entity 104 may then be provided to a presence service 102. The information for the entity 104 is indexed on the presence service 102. The information may then be distributed using a distributed hash table to one or more other presence services 102 in the presence service view. A node that is interested in the presence entity may then locate where the advertised presence entity 104 is at by querying the presence service view, which may use the distributed hash table to locate the target presence entity 104. When a presence service 102 receives a query for a particular entity 104, it distributes that query through the presence service view until a matching advertisement is located. Once the target presence entity 104 is found, a contract negotiation between the node hosting the presence entity 104 and the node requesting the presence entity 104 may be performed. For example, part of a contract negotiated between two nodes for access of a printer entity provided by one of the nodes may be to tell the querying node if the printer is offline, out of paper, ready, busy, etc. The contract may be negotiated in terms of asynchronous notification or a heartbeat notification, for example.

Figure 2:
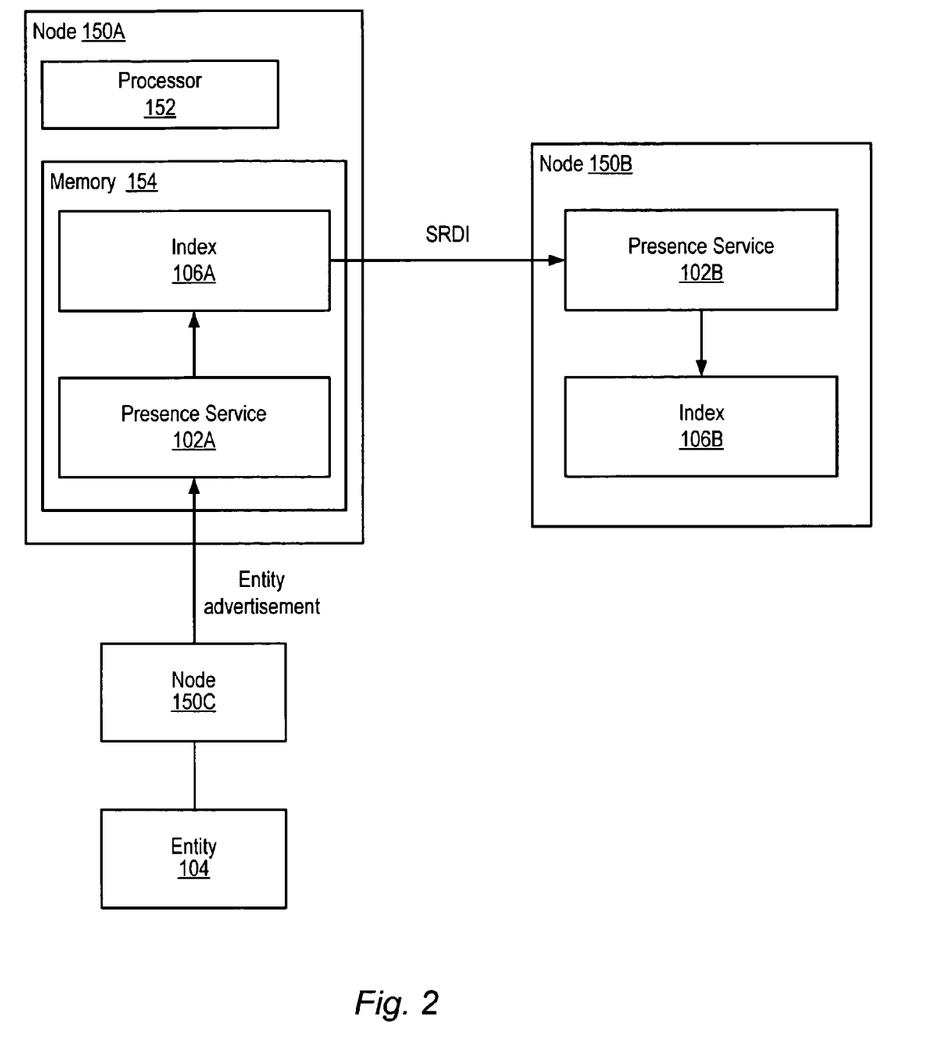
FIG. 2 illustrates a node implementing a presence service according to one embodiment.

FIG. 2 illustrates a node implementing a presence service according to one embodiment. Nodes 150 may be any of various types of devices, including, but not limited to, a personal computer system, desktop computer, laptop or notebook computer, mainframe computer system, workstation, network computer, Personal Digital Assistant (PDA), or other suitable device. In general, nodes 150 may be any devices with a digital heartbeat. A node 150, for example node 150A, may include at least one processor 152. The processor 152 may be coupled to a memory 154. Memory 154 is representative of various types of possible memory media, also referred to as "computer readable media." Hard disk storage, floppy disk storage, removable disk storage, flash memory and random access memory (RAM) are examples of memory media. The terms "memory" and "memory medium" may include an installation medium, e.g., a CD-ROM or floppy disk, a computer system memory such as DRAM, SRAM, EDO RAM, SDRAM, DDR SDRAM, Rambus RAM, etc., or a non-volatile memory such as a magnetic media, e.g., a hard drive or optical storage. The memory medium may include other types of memory as well, or combinations thereof. Nodes 150 may couple over a network to one or more other devices via one or more wired or wireless network interfaces.

Node 150A may include, in memory 154, an instance of a presence service 102A as described herein. Presence service 102A may interact with one or more other presence services 102 hosted on nodes in the P2P network, for example presence service 102B on node 150B, to form a presence service view. An entity 104, provided by node 150C, may be connected to presence service 102A in the presence service view via the network. Node 150C may provide an entity advertisement including presence information for the entity 104 to the presence service 102A. The presence information for entity 104 may be indexed locally by the presence service 102A in index 106A. Presence service 102A may share its index 106A with presence service 102B within the presence service view, in one embodiment via a Shared Resource Distributed Index (SRDI) mechanism.

SRDI provides a generic mechanism that the presence services 102 may utilize to distribute indices 106. These indices 106 may be used by the presence services 102 within the presence service view to direct queries in the direction where the query is most likely to be answered, and to re-propagate messages to peers interested in the propagated messages. In one embodiment, indices 106 may be replicated among presence services 102 using a SHA1 (or other) hash of the entries modulus the presence service view.

In one embodiment, a replica of an index 106 may only be provided to one other presence service 102 using SRDI. Note that, in other embodiments, indices 106 may be replicated to more than one other presence service 102.

In one embodiment, within the index 106 in a presence service 102, the indexed advertisements for each entity 104 may include or indicate an expiration time, and the indexed advertisement may be removed from the index according to the expiration time. In one embodiment, if an edge node 150 leaves the network or is no longer interested in advertising the presence of an entity 104, the node 150 may send a message directing the presence service 102 to expire the advertisement. Thus, embodiments may support a default or specified expiration time for advertisements, or message may be used to directly expire an advertisement. Embodiments may support one or both implementations. In one embodiment, the default expiration time may be an infinite lifetime; at departure of an entity 104, the time may be set to a negative time to expire the advertisement for the entity 104. In one embodiment, advertisements may be given a limited lifetime, and the node 150 providing the entity 104 may periodically renew the advertisement to keep the entity "present" on the network.

In one embodiment, an edge node 150 may specify an infinite lifetime for an advertisement, and if the edge node leaves the network, the lifetime expires. The edge node 150 may be responsible for reestablishing the connection and re-advertising the entity 104 when the node comes back up. In one embodiment, the presence service 102 may be responsible for detecting that a node 150 and/or entity or entities provided by the node is no longer present. In one embodiment, presence services 102 may rely on one or more mechanisms provided by the P2P platform (e.g., JXTA), such as connectivity, to detect when a node 150 and/or entity or entities provided by the node 140 are no longer present. In one embodiment, a presence service 102 may determine that a node 150 and/or entity 104 is no longer present when an attempt to forward a query to the node/entity fails; the presence service 102 realizes the entity 104 that is the target of the query is no longer present and expires the advertisement for the entity 104. Note that, in one embodiment, an entity 104 is not considered present until a connection to it is made and, subsequently, a contract is established.

In one embodiment, in a JXTA peer-to-peer network, presence services may implement a Resolver SrdiHandler and register with a Resolver Service. The ResolverSrdi message is a generic envelope that defines the Handler name (service identifier), and a credential document associated with the message; however, it does not define the payload. A generic SRDI message for the Discovery Service and the Pipe Service may be provided. A custom SRDI payload for handling presence information may be provided.

Figure 3A:
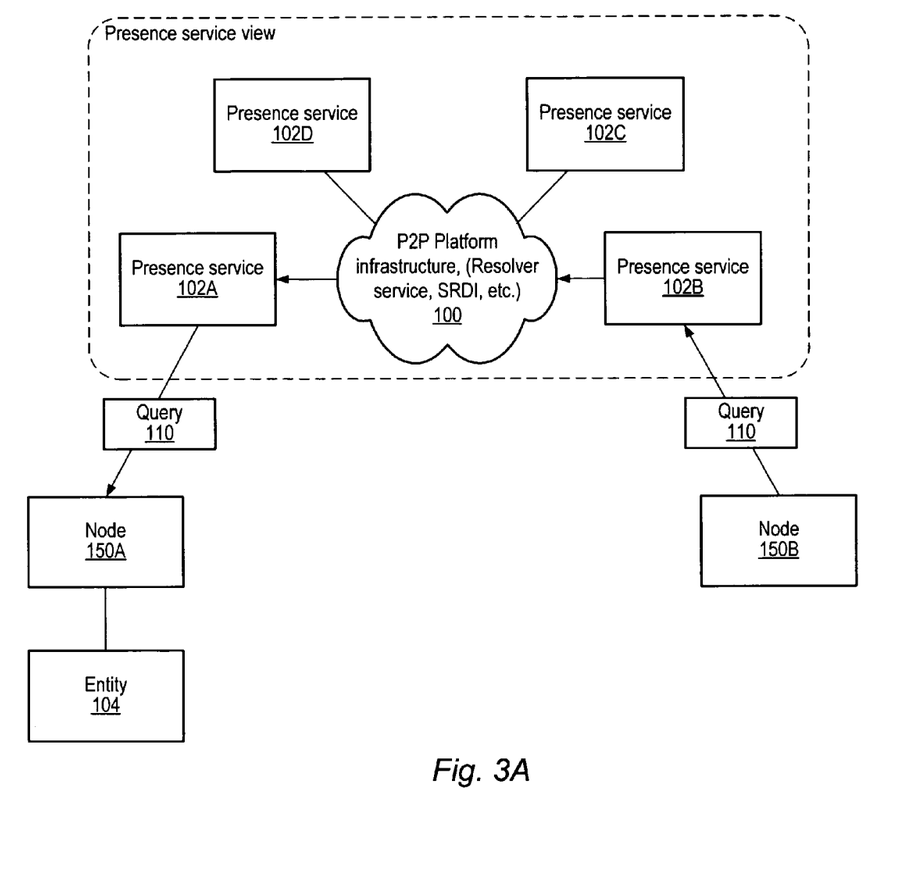
FIGS. 3A through 3C illustrate a node issuing a query for an entity, routing the query to the entity via the presence service view, and the node directly negotiating a presence contract with another node that provides the entity according to one embodiment.
Figure 3B:
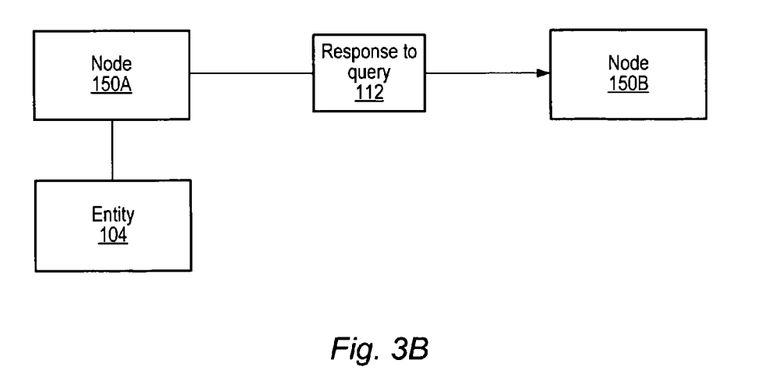
Figure 3C:
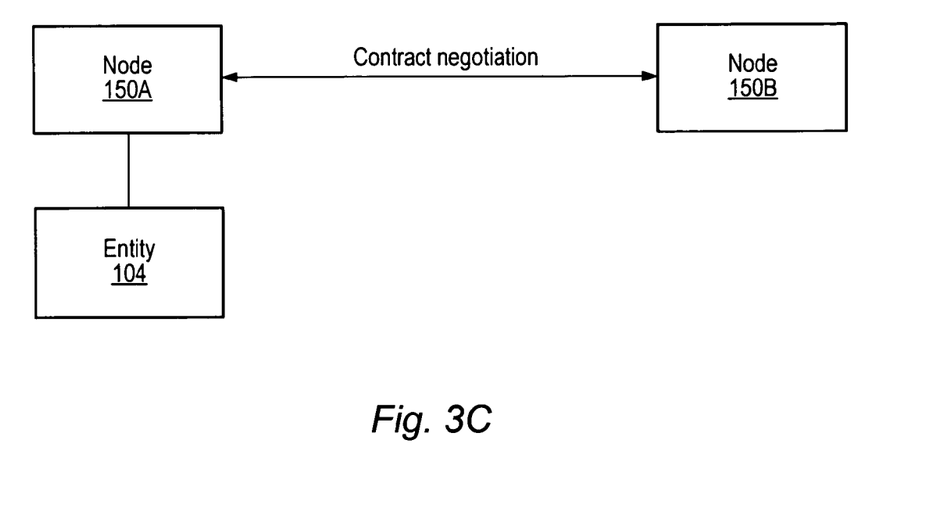

FIGS. 3A through 3C illustrate a node issuing a query for an entity, routing the query to the entity via the presence service view, and the node directly negotiating a presence contract with another node that provides the entity according to one embodiment. An entity 104, provided by node 150A, may be connected to a node (e.g. a rendezvous peer in a JXTA network) hosting presence service 102A in the presence service view via a network connection. Node 150A may provide an entity advertisement including presence information for the entity 104 to the presence service 102A. The presence information for entity 104 may be indexed locally by the presence service 102A. Presence service 102A may interact with one or more other presence services hosted on nodes in the P2P network, for example presence service 102B, to form a presence service view. Presence service 102A may share its index with one or more other presence services 150 within the presence service view, in one embodiment via a Shared Resource Distributed Index (SRDI) mechanism. In one embodiment, the presence service 102A may take the advertisement, index it, and then hash the index, for example using a SHA1 hash. The hash of the index may be used to determine where to replicate the advertisement for the entity within the presence service view. After replication, the presence information for the entity exists on the presence service 102A that received the entity descriptor (advertisement) and is replicated to at least one other presence service 102 (e.g., presence service 102D).

A node 150B connected to the presence service view may issue a query 110 for entity 104. In this example, node 150B sends query 110 to presence service 102B. Presence service 102B may not know anything about the target entity 104; in other words, presence service 102B's index may not include any presence information for the target entity 104. The query 110 may then be routed in the presence service view using the shared indices to the particular presence service 102A that originally received and indexed the advertisement for the entity 104, or alternatively to another presence service 102 with which the original presence service 102A shared its index. In one embodiment, the presence service 102B may hash the query 110 to determine where to forward the query 110 within the presence service view. In one embodiment, a resolver service or services may be used in routing queries to presence services 102 in the P2P network. The query 110 may then be forwarded to the node 150A that hosts or provides the target entity 104.

A query 110 may be a specific query for a particular entity 104 or, alternatively, a generic query for a particular type or class of entity, or for a set or group of entities. An entity 104 is described through an advertisement. The entity descriptor (advertisement) may be used to indicate which elements of the entity information are indexed. Thus, an entity may be advertised and indexed on one or more elements or aspects of the entity. Queries may be issued for any of the indices that are defined in the advertisement. Thus, a query may be resolved to more than one presence entity 104, or may be resolved to one particular entity 104, e.g. to a particular user or printer. In one embodiment, if a query 110 resolves to more than one entity 104, the query 110 may be forwarded to all the presence entities 104 that qualify. Thus, the node 150 that initiated the query may get back responses from more than one presence entity 104. For example, a node 150 that is querying for a printer to handle a print job may get back responses from multiple printers. It is up to the node 150 to determine which particular entity 104 to communicate with if the node 150 receives more than one response to a query 110. Note that more than one entity may be indexed on information that can be used to query for classes or sets of entities. Nodes 150 may then issue queries to locate all presence entities 104 of a particular class or set. For example, a node may issue a query that specifies a class of printers to look for printers in that class of printers, and may receive responses from all printers of that class. As another example, user information in an advertisement may include user group information indicating a group the user is a member of; a node may search for all users in the user group using a query that specifies the user group as an index.

Note that this example illustrates the query 110 being routed through two presence services 102; however, a query 110 may be routed through more than two presence services 102 in the presence service view. The presence service view routes the query 110 to the correct edge node 150.

In FIG. 3B, after receiving the query 110, the node 150A hosting the target entity 104 may send a response message 112 directly to the querying node 150B. In FIG. 3C, the two nodes 150A and 150B may directly negotiate a contract for accessing the entity 104. A contract may be any sort of contract, and the contract may depend upon the entity 104 and the needs of the requesting node 102. Note that different entities may require contracts covering different sorts of events. Contracts may include a heartbeat, event-based notifications, etc.

Contract negotiation may be performed with P2P platform protocols (e.g., JXTA protocols) or via any other mechanism or protocol. Information on how to communicate with a presence entity 104 may be included in the advertisement or provided to the requesting node 150B in a message 112 from the node providing the entity.

Embodiments of the decentralized entity presence mechanism may be used in the accessing of various services and devices (entities). For example, a peer node may want to locate a printer to print a specific print job. The decentralized entity presence mechanism may be used to locate a printer that is available to handle the specific print job. After locating the printer using the decentralized entity presence mechanism, a contract may be directly negotiated between the peer node and the printer (or a node providing the printer) to perform the particular print job. Once located, the node providing the printer (or the printer itself) and the node requesting the printer may communicate to determine, for example, if the printer is available and is able to perform the print job. As another example, the requesting node may include an administration application that desires to monitor the status of a set of printers; a contract may be set up between the application and the printer(s) to receive event notifications from the printer(s).

Figure 4:
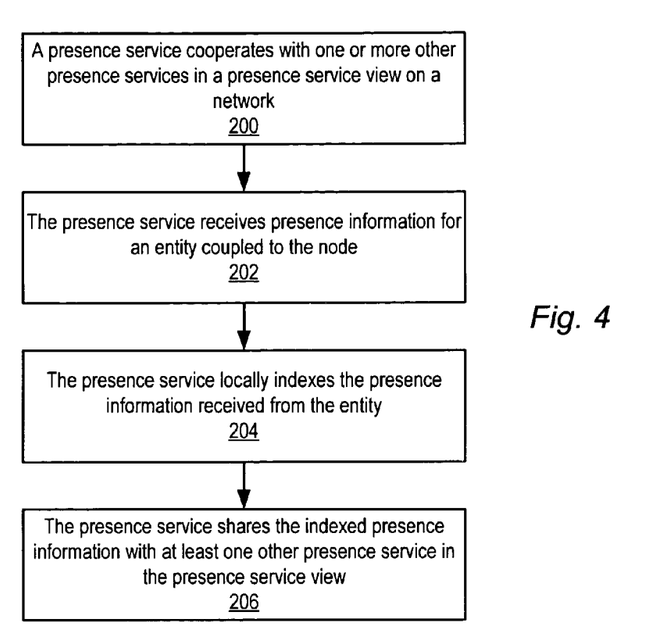
FIGS. 4 and 5 are flowcharts of a method for providing decentralized entity presence according to one embodiment.
Figure 5:
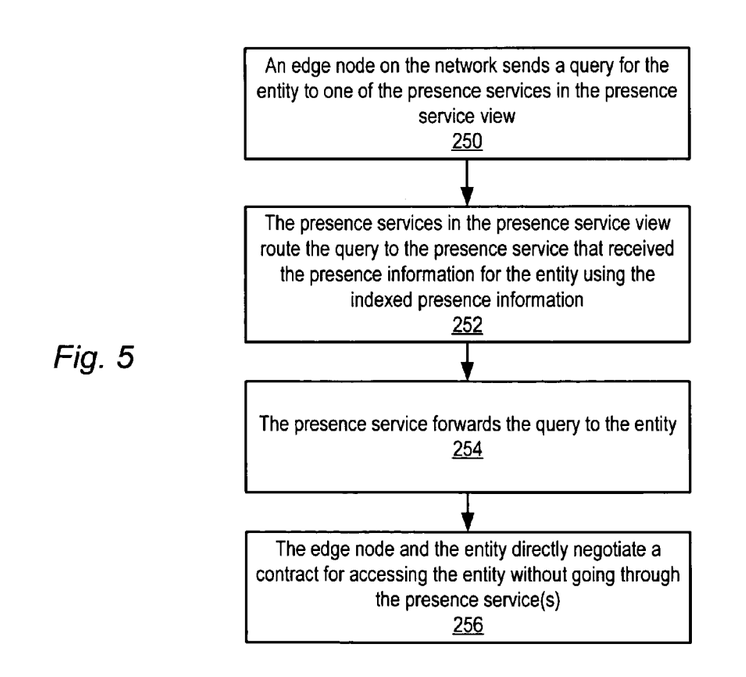

FIGS. 4 and 5 are flowcharts of a method for providing decentralized entity presence according to one embodiment. In FIG. 4, a presence service on a node cooperates with one or more other presence services in a presence service view on a network, as indicated at 200. In one embodiment, the nodes hosting the presence services are peer nodes participating in a peer-to-peer network according to a peer-to-peer platform. In one embodiment, the peer-to-peer platform may be the JXTA platform. As indicated at 202, the presence service may receive presence information for an entity coupled to the node. In one embodiment, the presence information may be provided to the presence service in a peer-to-peer platform advertisement. In one embodiment, the entity may be provided by an edge node on the network, and the entity may couple to the presence service via the edge node. As indicated at 204, the presence service may locally index the presence information received from the entity. As indicated at 206, the presence service may share the indexed presence information with at least one other presence service in the presence service view. In one embodiment, the indexed presence information may be shared using Shared Resource Distributed Index (SRDI). The indexed presence information may be used in routing queries for particular entities through the presence service view to the particular entities.

In FIG. 5, an edge node on the network sends a query for the entity to another one of the presence services in the presence service view, as indicated at 250. As indicated at 252, the presence services in the presence service view route the query to the presence service that received the presence information for the entity using the indexed presence information, or alternatively to another presence service with which the indexed presence information was shared. Upon receiving the query, the presence service forwards the query to the entity, as indicated at 254. Upon receiving the query, the edge node that initiated the query and the entity may directly negotiate a contract for accessing the entity without going through the presence service, as indicated at 256.

In one embodiment, the presence information for the entity may specify an expiration time for the presence information, and the presence service may expire the presence information for the entity according to expiration time.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or CD-ROM, volatile or non-volatile media such as RAM (e.g. SDRAM, DDR SDRAM, RDRAM, SRAM, etc.), ROM, etc. as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A network system, comprising:

two or more nodes each configured to implement an instance of a presence service on a network, wherein the presence service instances are configured to cooperatively form a presence service view on the network, wherein each presence service instance in the presence service view is configured to locally store presence information received from one or more entities coupled to the presence service instance and to distribute an index of the locally stored presence information to one or more other presence service instances in the presence service view;

an entity configured to couple to one of the presence service instances, wherein the entity is further configured to provide presence information corresponding to the entity to the presence service instance to publish the entity as present on the network; and an edge node configured to send a query for the entity to another one of the presence service instances in the presence service view;

wherein the presence service instances in the presence service view are configured to route the query through the presence service view to the entity in accordance with the distributed indexes; and wherein, in response to the entity receiving the query, the edge node and the entity are configured to communicate directly, without going through any of the presence service instances, to negotiate a contract for the edge node accessing the entity.

2. The network system as recited in claim 1, wherein the entity is provided by another edge node on the network, and wherein the entity is configured to couple to the presence service instance via the other edge node.

3. The network system as recited in claim 1, wherein the indexes of locally stored presence information are distributed among the presence service instances in accordance with Shared Resource Distributed Index (SRDI).

4. The network system as recited in claim 1, wherein the two or more nodes configured to implement instances of the presence service on the network are configured as peer nodes in a peer-to-peer network according to a peer-to-peer platform.

5. The network system as recited in claim 4, wherein the peer-to-peer platform is JXTA.

6. The network system as recited in claim 1, wherein the presence information corresponding to the entity is provided to the presence service instance in a peer-to-peer platform advertisement.

7. The network system as recited in claim 1, wherein the presence information corresponding to the entity specifies an expiration time for the presence information, wherein the presence service instances in the presence service view are configured to expire the presence information corresponding to the entity according to the expiration time.

8. A network system, comprising:

a plurality of nodes each configured to implement an instance of a presence service on a network, wherein the presence service instances are configured to cooperatively form a presence service view on the network;

a plurality of entities each configured to couple to one of the presence service instances, wherein each entity is further configured to provide presence information corresponding to the entity to a presence service instance to which it is coupled to publish the entity as present on the network;

wherein each presence service instance is configured to:
locally store presence information received from one or more of the plurality of entities coupled to the presence service instance; and
distribute an index of the locally stored presence information to at least one other of the presence service instances in the presence service view;
an edge node configured to send a query for a particular one of the plurality of entities to one of the presence service instances in the presence service view;
wherein the presence service instances in the presence service view are configured to route the query through the presence service view to the particular one of the plurality of entities according to the distributed indexes; and
wherein, in response to the particular one of the plurality of entities receiving the query, the edge node and the particular one of the plurality of entities are configured to communicate directly, without going through any of the presence service instances, to negotiate a contract for the edge node accessing the entity.

9. The network system as recited in claim 8, further comprising:
wherein the particular one of the plurality of entities is provided by another edge node on the network, and wherein the particular entity is configured to couple to a particular presence service instance in the presence service view via the other edge node;
wherein the presence service instances in the presence service view are configured to route the query through the presence service view to the other edge node according to the distributed indexes; and
wherein the edge node and the other edge node are configured to communicate directly, without going through any of the presence service instances, to negotiate the contract for the edge node to access the entity.

10. The network system as recited in claim 8, wherein the indexes of locally stored presence information are distributed among the presence service instances in accordance with Shared Resource Distributed Index (SRDI).

11. The network system as recited in claim 8, wherein the plurality of nodes configured to implement instances of the presence service on the network are configured as peer nodes in a peer-to-peer network according to a peer-to-peer platform.

12. The network system as recited in claim 11, wherein the peer-to-peer platform is JXTA.

13. The network system as recited in claim 8, wherein the presence information corresponding to the entities is provided to the presence service instances in peer-to-peer platform advertisements.

14. The network system as recited in claim 8, wherein the presence information corresponding to each entity specifies an expiration time for the presence information, wherein the presence service instances in the presence service view are configured to remove the presence information corresponding to the entity according to the expiration time.

15. A node, comprising:
a processor; and
a memory comprising program instructions, wherein the program instructions are executable by the processor to implement a presence service configured to:
cooperate with one or more other presence services on other nodes to form a presence service view on a network;
receive presence information corresponding to an entity coupled to the node, wherein the received presence information publishes the entity as present on the network;
locally store the presence information corresponding to the entity; and
distribute an index of the locally stored presence information to at least one other presence service in the presence service view;
receive a query originating from a particular node on the network for the entity coupled to the node via the presence service view, wherein the query is routed to the entity through the presence service view according to the distributed index; and
forward the query to the entity;
wherein, in response to the entity receiving the query, the particular node and the entity are configured to communicate directly, without going through any of the presence service instances, to negotiate a contract for the particular node accessing the entity.

16. The node as recited in claim 15, wherein the entity is provided by an edge node on the network, and wherein the entity is configured to couple to the presence service via the edge node.

17. The node as recited in claim 15, wherein the index of the locally stored presence information is distributed in accordance with Shared Resource Distributed Index (SRDI).

18. The node as recited in claim 15, wherein the node is configured as a peer node in a peer-to-peer network according to a peer-to-peer platform.

19. The node as recited in claim 18, wherein the peer-to-peer platform is JXTA.

20. The node as recited in claim 15, wherein the presence information corresponding to the entity is provided to the presence service in a peer-to-peer platform advertisement.

21. The node as recited in claim 15, wherein the presence information corresponding to the entity specifies an expiration time for the presence information, wherein the presence service is further configured to expire the presence information corresponding to the entity according to expiration time.

22. A network system, comprising:
means for distributing presence information for entities on a network among a plurality instances of a presence service, wherein the presence information for an entity publishes the entity as present on the network wherein the presence service instances are configured to cooperatively form a presence service view on the network and wherein each presence service instance is configured to locally store presence information received from one or more entities coupled to the presence service instance and to distribute an index of the locally stored presence information to one or more other presence service instances;
means for routing queries for particular entities from edge nodes on the network through the plurality of presence service instances to the particular entities on the network using the distributed presence information; and
means for directly, without going through any of the presence service instances, negotiating contracts between the edge nodes and the particular entities in response to said queries.

23. A method, comprising:
a presence service instance on a node in a network cooperating with one or more other presence service instances on other nodes to form a presence service view on the network;

the presence service instance receiving presence information for an entity coupled to the node, wherein the received presence information publishes the entity as present on the network;

the presence service instance locally storing the presence information received from the entity;

the presence service instance distributing an index of the locally stored presence information to at least one other presence service instance in the presence service view;

routing a query from another node on the network through the presence service view to the entity coupled to the node according to the distributed index; and in response to the entity receiving the query, the other node and the entity communicating directly, without going through any of the presence service instances, to negotiate a contract for the other node accessing the entity.

24. The method as recited in claim 23, wherein the other node is an edge node on the network, and wherein said routing a query from another node on the network through the presence service view to the entity coupled to the node according to the distributed index comprises:

the edge node sending a query for the entity to another one of the presence service instances in the presence service view;

the presence service instances in the presence service view routing the query to the presence service instance on the node to which the entity is coupled according to the distributed index; and the presence service instance on the node to which the entity is coupled forwarding the query to the entity.

25. The method as recited in claim 23, wherein the entity is provided by an edge node on the network, and wherein the entity couples to the presence service instance via the edge node.

26. The method as recited in claim 25, wherein the index of locally stored presence information is distributed in accordance with Shared Resource Distributed Index (SRDI).

27. The method as recited in claim 23, wherein the nodes comprising the presence service instances are peer nodes in a peer-to-peer network according to a peer-to-peer platform.

28. The method as recited in claim 27, wherein the peer-to-peer platform is JXTA.

29. The method as recited in claim 23, further comprising the entity providing the presence information to the presence service instance in a peer-to-peer platform advertisement.

30. The method as recited in claim 23, wherein the presence information corresponding to the entity specifies an expiration time for the presence information, the method further comprising the presence service instances expiring the presence information corresponding to the entity according to expiration time.

31. A computer-accessible storage medium storing program instructions, wherein the program instructions are computer-executable to implement:

instantiating a presence service on each of multiple nodes on a network;

the presence service instances cooperating to form a presence service view on the network;

one of the presence service instances receiving presence information for an entity coupled to the node on which the presence service instance resides, wherein the received presence information publishes the entity as present on the network;

the presence service instance locally storing the presence information received from the entity;

the presence service instance distributing an index of the locally stored presence information to at least one other presence service instance in the presence service view;

routing a query originating from another node on the network through the presence service view to the entity coupled to the node according to the distributed index; and wherein, in response to the entity receiving the query, the other node and the entity communicate directly, without going through any of the presence service instances, to negotiate a contract for the other node accessing the entity.

32. The computer-accessible storage medium as recited in claim 31, wherein the other node is an edge node on the network, and wherein, in said routing a query from another node on the network through the presence service view to the entity coupled to the node according to the distributed index, the program instructions are further computer-executable to implement:

the edge node sending a query for the entity to another one of the presence service instances in the presence service view;

the presence service instances in the presence service view routing the query to the presence service instance on the node to which the entity is coupled according to the distributed index; and the presence service instance on the node to which the entity is coupled forwarding the query to the entity.

33. The computer-accessible storage medium as recited in claim 31, wherein the entity is provided by an edge node on the network, and wherein the entity couples to the presence service via the edge node.

34. The computer-accessible storage medium as recited in claim 33, wherein the index of locally stored presence information is distributed in accordance with Shared Resource Distributed Index (SRDI).

35. The computer-accessible storage medium as recited in claim 31, wherein the multiple nodes on which the presence service is instantiated are peer nodes in a peer-to-peer network according to a peer-to-peer platform.

36. The computer-accessible storage medium as recited in claim 35, wherein the peer-to-peer platform is JXTA.

37. The computer-accessible storage medium as recited in claim 31, wherein the program instructions are further computer-executable to implement providing the presence information corresponding to the entity to the presence service instance in a peer-to-peer platform advertisement.

38. The computer-accessible storage medium as recited in claim 31, wherein the presence information corresponding to the entity specifies an expiration time for the presence information, wherein the program instructions are further computer-executable to implement the presence service instances expiring the presence information corresponding to the entity according to expiration time.

* * * * *